United States Patent
Spangler et al.

(10) Patent No.: US 6,476,127 B1
(45) Date of Patent: Nov. 5, 2002

(54) COMPOSITIONS CONTAINING POLYCARBONATE AND GRAFTED RUBBER HAVING IMPROVED LOW-TEMPERATURE TOUGHNESS

(75) Inventors: Lora L. Spangler, Belchertown, MA (US); Venkatarayaloo Janarthanan, Gujarat (IN)

(73) Assignee: Bayer Corporation, Pittsburgh, PA (US)

( * ) Notice: Subject to any disclaimer, the term of this patent is extended or adjusted under 35 U.S.C. 154(b) by 16 days.

(21) Appl. No.: 09/711,553

(22) Filed: Nov. 13, 2000

Related U.S. Application Data

(63) Continuation-in-part of application No. 09/276,215, filed on Mar. 25, 1999, now abandoned.

(51) Int. Cl.$^7$ .............................................. C08L 69/00
(52) U.S. Cl. ........................................................ 525/67
(58) Field of Search .......................................... 525/67

(56) References Cited

U.S. PATENT DOCUMENTS

| | | | |
|---|---|---|---|
| 3,509,237 A | 4/1970 | Aubrey .................... | 260/876 |
| 3,954,905 A | 5/1976 | Margotte et al. ............ | 260/873 |
| 4,535,124 A | 8/1985 | Binsack et al. ................ | 525/67 |
| 4,560,725 A | 12/1985 | Van Bokhoven et al. ...... | 525/67 |
| 4,677,162 A | 6/1987 | Grigo et al. ................... | 525/67 |
| 4,868,235 A | * 9/1989 | Muehlbach | |
| 4,880,875 A | 11/1989 | Wassmuth et al. ............. | 525/67 |
| 5,162,423 A | 11/1992 | Neumann et al. ............ | 524/504 |
| 5,420,181 A | 5/1995 | Eichenauer et al. .......... | 524/91 |
| 5,679,759 A | 10/1997 | Wittmann et al. ........... | 528/196 |

FOREIGN PATENT DOCUMENTS

| | | |
|---|---|---|
| DE | 19639821 | 4/1998 |
| JP | 08-193157 | * 7/1996 |

* cited by examiner

*Primary Examiner*—David J. Buttner
(74) *Attorney, Agent, or Firm*—Joseph C. Gil; Aron Preis; James R. Franks

(57) ABSTRACT

A thermoplastic molding composition suitable for preparing molded articles having improved properties, most notably high ductility and impact strength at low temperature, is disclosed. The composition contains a resinous blend of aromatic polycarbonate and a mixture of at least two grafted rubbers. The mixture of grafted rubbers contains a "small-mode" component having a weight average particle size of less than 0.3 microns and a "large-mode" component having a weight average particle size of 0.3 microns or larger. The inventive composition is characterized in the absence of flaky filler having an aspect ratio is at least 1.7 and particle size of 1–100 microns therefrom.

13 Claims, No Drawings

COMPOSITIONS CONTAINING POLYCARBONATE AND GRAFTED RUBBER HAVING IMPROVED LOW-TEMPERATURE TOUGHNESS

CROSS REFERENCE TO RELATED PATENT APPLICATION

The present patent application is a Continuation-In-Part of and claims the right of priority under 35 U.S.C. §120 of U.S. patent application Ser. No. 09/276,215, filed Mar. 25,1999, now abandoned.

FIELD OF THE INVENTION

The present invention relates to a thermoplastic molding composition and more particularly to a composition containing polycarbonate and grafted rubber.

SUMMARY OF THE INVENTION

A thermoplastic molding composition suitable for preparing molded articles having improved properties, most notably high ductility and impact strength at low temperature, is disclosed. The composition contains a resinous blend of aromatic polycarbonate and a mixture of at least two grafted rubbers. The mixture of grafted rubbers contains a "small-mode" component having a weight average particle size of less than 0.3 microns and a "large-mode" component having a weight average particle size of 0.3 microns or larger. The inventive composition is characterized in the absence of flaky filler having an aspect ratio is at least 1.7 and particle size of 1–100 microns therefrom.

TECHNICAL BACKGROUND OF THE INVENTION

Thermoplastic molding compositions containing grafted rubber, such as ABS, and polycarbonate resin are known. Commercial products based on such compositions, notably Bayblend compositions that are available from Bayer Corporation, have long enjoyed wide market acceptance. U.S. Pat. Nos. 3,954,905 and 4,560,725 are noted to have disclosed relevant compositions. Also known are compositions which include ABS components, the rubber particles of which conform to bimodal size distributions. The art is noted to include U.S. Pat. No. 3,509,237 which disclosed a composition containing first and second graft copolymers having a rubber substrate and a superstrate of an interpolymer of a monovinylidene aromatic hydrocarbon and an unsaturated nitrile. The first and second graft copolymers have a number average particle size, of 0.8 to 2.0 microns and 0.01 to 0.25 microns respectively. The first graft is said to be a product of suspension polymerization and the second is produced by emulsion. U.S. Pat. No. 4,677,162 is noted for its disclosed composition, which contains polycarbonate, a graft copolymer and an impact modifier. While the graft copolymer entails particles averaging more than 0.75 microns, the impact modifier entailed in the working examples embraces a second graft copolymer having presently relevant chemical makeup and particle size. JP (Kokai) 8 193157 is noted to have disclosed a flame retardant thermoplastic resin composition that contains 15–70 parts by weight (pbw) of rubber reinforced vinyl-based resin that contains 1–5 pbw of small particle size rubber (weight average particle size is less than 0.3 μm (micron) and 3 to 10 pbw of a large particle size rubber, of which the particle size is at least 0.3 micron but not larger than 2 microns. The composition also contains polycarbonate (30–85 pbw) and per 100 parts by weight of such composition it contains 5 to 30 pbw of a flaky filler, such as talc, mica, wollastonite and glass flake, having an aspect ratio is at least 2 and the particle size is 1–100 microns. The present invention is characterized in, among others, the absence of such flaky filler having aspect ratio of at least 1.7. The absence of such flaky filler from the composition of the present invention renders these composition greater ductility—see the experimental section below.

DETAILED DESCRIPTION OF THE INVENTION

The inventive composition contains a resinous blend of about 60 to 80 percent polycarbonate resin and 20 to 40 percent of a mixture of at least two grafted rubbers. In a preferred embodiment, the blend contains 65 to 75 percent polycarbonate and 25 to 35 percent of the mixture; in all instances, the percents are in relation to the weight of the blend. The mixture of grafted rubbers contains a "small-mode" component (ABS-s) having a weight average particle size smaller than 0.3 microns, preferably about 0.15 to 0.28 microns, and a "large-mode" component (ABS-I), wherein weight average particle size is at least 0.3 micron, preferably about 0.35 to 0.65 micron. The weight ratio ABS-s/ABS-I in the mixture ranges from 3/27 to 7.5/22.5,preferably 3/27 to 5/25. In the preferred embodiments, ABS-s is a product of the well-known emulsion polymerization process and ABS-I is a product of the known mass, more preferably continuous mass, polymerization process. The inventive composition is characterized in the absence therefrom of flaky filler having an aspect ratio is at least 2 and the particle size is 1–100 microns.

The aromatic polycarbonate resins useful in the context of the present invention include homopolycarbonates and copolycarbonates and mixtures thereof. The suitable polycarbonates have a weight average molecular weight of 10,000 to 200,000, preferably 20,000 to 80,000 and their melt flow rate, per ASTM D-1238 at 300° C., is about 1 to about 65 g/10 min., preferably about 2 to 24 g/10 min. These resins may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

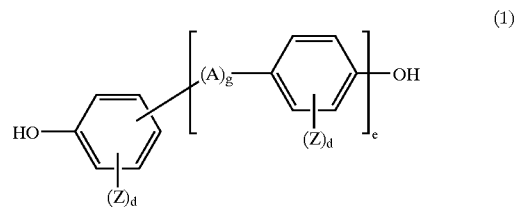

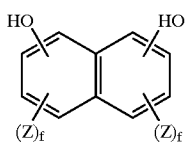

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—, or —SO$_2$— or a radical conforming to

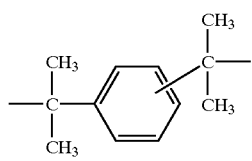

e and g both denote the number 0 to 1; Z denotes F, Cl, Br or C$_{1-4}$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxy-phenyl)-sulfoxides, bis-(hydroxyphenyl)-sulfides, bis-(hydroxyphenyl)-sulfones, and α, α-bis-(hydroxyphenyl)-diisopropylbenzenes, as well as their nuclear-alkylated compounds. These and further suitable aromatic dihydroxy compounds are described, for example, in U.S. Pat. Nos. 5,126,428; 5,104,723; 5,041,521; 5,034,457; 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α, α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is included phenolphthalein-based polycarbonate, copolycarbonates and terpolycar-bonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514.The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenyl methane; 2,2-bis-[4,4-(4,4'-dihydroxydiphenyl)]-cyclohexyl-propane; 2,4-bis-(4-hydroxy-1-iso-propylidine)-phenol; 2,6-bis-(2'-dihydroxy-5'-methylbenzyl)-4-methyl-phenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxy-phenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon 2400, Makrolon 2600, Makrolon 2800 and Makrolon 3100, all of which are bisphenol based homopolycarbonate resins differing in terms of their respective molecular weights and characterized in that their melt flow indices (MFR) per ASTM D-1 238 are about 16.5 to 24, 13 to 16, 7.5 to 13.0 and 3.5 to 6.5 g/10 min., respectively. These are products of Bayer Corporation of Pittsburgh, Pa.

Polycarbonate resins suitable in the practice of the invention are known and their structures and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The mixture included in the inventive composition contains a "small-mode" component (ABS-s) having a weight average particle size smaller than 0.3 microns, preferably 0.15 to 0.28 micron, and a "large-mode" component (ABS-I) having a weight average particle size of at least 0.3 micron, preferably 0.35 to 0.65 micron. The weight ratio ABS-s/ABS-I in the mixture ranges from 3/27 to 7.5/22.5, preferably 3/27 to 5/25.

The grafted phase in both grafted rubber components of the instant mixture contains a monovinylidene aromatic hydrocarbon and an unsaturated nitrile. Such monomers comprise at least 50.0 percent by weight, preferably at least 75 percent by weight of the grafted phase. Most desirably, such monomers comprise at least 90 percent of the grafted phase. Minor amounts, preferably less than 10 percent of other comonomers may be included. Examples of the monovinylidene aromatic hydrocarbons which may be used in the preparation of the grafted phase include styrene, alpha-alkyl monovinylidene monoaromatic compounds, e.g., alpha-methylstyrene, alpha-ethylstyrene, alpha-methylvinyltoluene, alpha-methyl dialkylstyrenes, etc., ring-substituted alkyl styrenes, e.g., vinyl toluene, o-ethylstyrene, p-ethylstyrene, 2,4-dimethylstyrene, etc., ring-substituted halostyrenes, e.g., o-chlorostyrene, p-chlorostyrene, o-bromostyrene, 2,4-dichlorostyrene, etc., ring-alkyl, ring-halosubstituted styrenes, e.g., 2-chloro-4-methylstyrene, 2,6-dichloro-4-methylstyrene, etc., vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Examples of the unsaturated nitrites, which may, singly or in combination one with the others, be used in the preparation of the grafted phase include acrylonitrile, methacrylonitrile, and ethacrylonitrile.

Examples of additional monomers which may be copolymerized in small amounts in the grafted phase include conjugated 1,3 dienes, e.g., butadiene, isoprene, etc.; alpha- or beta-unsaturated mono-basic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. The polymerizable monomer mixture forming the grafted phase contains at least 20 percent by weight of the monovinylidene aromatic monomer and preferably at least 50 percent by weight thereof. They also contain at least 5 percent by weight of the unsaturated nitrile and preferably at least 10 percent by weight thereof. From the standpoint of highly advantageous commercial practice, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

The rubber substrate in both grafted rubber components onto which the grafted phase is grafted during the polymerization process and in the presence thereof is a diene rubber. These are prepared of one or more conjugated 1,3-dienes, such as, butadiene, isoprene, piperylene, chloro-prene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; an aralkyl-styrene, such as the o-, m-, and p-methylstyrenes, 2,4-dimethylstyrene, the arethyl-styrenes, p-tert-butylstyrene, etc.; an alpha-alkylstyrene, such as alpha-methylstyrene, alpha-ethylstyrene, alpha-methyl-p-ethylstyrene, etc.;

vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

The rubber substrate may be crosslinked by the addition into the polymerizable mixture up to about 2 percent, relative to the weight of the rubber forming monomers, of a conventional crosslinking agent, such as divinyl-benzene, diallyl meleate, diallyl fumerate, diallyl adipate, allyl acrylate, allyl methacrylate, diacrylates and dimethacrylates of polyhydric alcohols, such as ethylene glycol dimethacrylate.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Preferably, the ABS-s component of the invention is made by the known emulsion polymerization process. Its rubber substrate amounts to about 50 to 60% relative to its weight and the grafted phase is characterized in that the weight ratio of the polymerized monovinylidene aromatic hydrocarbons to the polymerized unsaturated nitriles is 70-80/30-20, preferably 75-78/25-22.

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 1 to 15 parts by weight per 100 parts by weight of the monomers, and water is provided in an amount of about 1 to 4 parts per part of monomers, and even in larger ratios where greater dilution is desirable.

If so desired, aqueous latex formed in the emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and perazo catalysts and the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates, and percarbonates, and hydrogen peroxide. If so desired, the catalysts may be activated to form redox systems. In addition, it may be advantageous to include an oil-soluble catalyst such as those hereinbefore identified for mass-emulsion polymerization processes. However, other free-radical generating catalysts may be employed such as actinic radiation.

Chain transfer agents and other polymerization modifiers may desirably be included and it is generally advantageous to incorporate a higher alkyl mercaptan, such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20 to 100° centigrade with agitation. Pressures of 1 to 100 pounds per square inch may be employed and the monomers and/or additional catalyst may be added incrementally or continuously over a portion of the reaction cycle. Polymerization is continued until substantially all, i.e., more than 90 percent, of the monomers have reacted. The remaining monomers and other volatile components are then distilled from the latex, which is then dewatered, and dried.

The ABS-I component of the inventive composition is preferably made by the known mass, more preferably continuous mass polymerization process. The rubber in this graft copolymer is preferably butadiene or butadiene/styrene copolymer (90/10 by weight) and the rubber content is about 14 to 20% relative to the weight of the graft copolymer. The grafted phase is characterized in that the weight ratio of the polymerized monovinylidene aromatic hydrocarbons to the polymerized unsaturated nitrites is 73-80/27-20, preferably 75-78/25-22.

In the continuous mass polymerization process, the rubber substrate is initially dissolved in the monomers and the solution, initiator and any other optional components such as a solvent are continuously charged to a stirred or unstirred reactor which provides a continuous polymerization zone containing the polymerizing mixture with a substantially uniform composition throughout. A plurality of reactors may be employed in series with each operating in a continuous mode in which the polymerization is advanced to the required conversion. After polymerization has progressed to the desired conversion level, the residual monomer is stripped from the polymer. The devolatilizing operation, which is the same whether one or a series of polymerization reactors is employed, is conventionally done in a separate device such as a wiped film or falling strand devolatilizer.

Typical prior art processes for the continuous production of grafted rubbers by mass polymerization are described in U.S. Pat. Nos. 3,243,481, 3,337,750, 3,511,895 and 4,417,030, the content of the latter being incorporated herein by reference.

The polymerization may be initiated by any free radical generating initiator that promotes grafting and is activated at the contemplated reaction temperatures. Suitable initiators comprise the conventional monomer-soluble peroxy and perazo compounds. Exemplary initiators are t-butyl-peroxy-neodecanoate, t-butyl-peroxy-2-ethylhexanoate, 1-t-butyl-azo-1-cyanocyclohexane, di-tert-butyl peroxide, benzoyl peroxide lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di-(tert-butylperoxy) hexane, 2,5-dimethyl-2,5-di-(tert-butylperoxy)-hexyne-3, tert-butyl hydroperoxide, bumene hydroperoxide, p-methane hydroperoxide, cyclopentane, hydroperoxide, diisopropylbenzene hydroperoxide, p-tert-butylcumene hydroperoxide, penant hydroperoxide, 2,5-dimethylhexane-2,5-dihydroperoxide, as well as percarbonate compounds such as t-butyl-2-ethylhexyl-monoperoxycarbonate, etc. and mixtures thereof.

The initiator is generally included within the range of 0.001 to 1.0 percent by weight, and preferably on the order of 0.005 to 0.5 percent by weight of the polymerizable material, depending upon the monomers and the desired polymerization cycle.

It is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

A solvent or diluent can be used to dilute the reaction mixture to a point at which the power requirements for agitation in stirred reactor(s) are not excessive. Some or all of such diluents can be introduced with the rubber in monomer solution either as an added component or by use of a rubber which is already dissolved in a suitable solvent. Diluent can also be added separately to one or more of the reactors.

The diluents can be liquid aromatic hydrocarbons containing 6 to 10 carbon atoms, e.g., benzene, toluene, xylene, ethyl benzene, para cymene, cumene or mixtures thereof. Other organic solvents such as saturated aliphatic hydrocarbons, e.g., hexane, cyclohexane, cyclopentane and others having 5 to 7 carbon atoms, ketones, e.g., methyl ethyl ketone, methyl cyclopentane, methyl isobutyl ketone, cyclohexane or methyl propyl ketone can also be used. Methylethyl ketone is preferred.

A preferred continuous mass process for separately preparing ungrafted matrix copolymer is disclosed in U.S. Pat. No. 3,813,369 which is incorporated herein by reference. In summary, the monomers are continuously charged to a well-mixed polymerization reaction zone comprising liquid and vapor phases. The liquid phase contains the monomer composition as a solvent in which copolymer being formed from the monomer composition is dissolved. The vapor phase above the liquid phase comprises the monomer composition. Liquid and vapor are continuously removed from the reaction zone and replenished by charging at a rate about equal to the rate at which the monomers are polymerized and removed. The removed vapor phase may be condensed by reflux condensation and returned to the reaction zone as part of the monomer composition being charged to the zone. The mixture of withdrawn polymer and monomer is passed through one or more devolatilizers of the type referred to above to separate out the polymer. The hot melt may then be pelletized in conventional apparatus while the separated monomer is condensed and returned to the reaction zone. Chain transfer agents and liquid solvents, initiators, and other additives of the type described above with respect to the continuous mass graft polymerization process may be charged continuously with the monomer composition or separately to the reaction zone.

The average particle size of a rubber graft copolymer—i.e., the rubber substrate and its graft copolymer superstrate, is based upon the average of the particles of the several sizes in each rubber graft copolymer component. Particle size is measured using a photosedimentometer by the published procedure of Graves, M. J. et. al. "Size Analysis of Subsieve Powders Using a Centrifugal Photosedimentometer", British Chemical Engineering 9:742–744 (1964). Alternatively an electron microscope may be used.

The inventive composition may be prepared and processed conventionally by means and the following procedures that are well known to the art-skilled.

EXAMPLES

Compositions demonstrating the invention have been made and their properties were determined. The table below summarizes the results of the evaluation. In preparing the composition, the following components were used:

Polycarbonate: a homopolycarbonate based on bisphenol A, having a melt flow rate of about 11 gm/10 min. as determined in accordance with ASTM D-1238.

ABS-I (a): a graft copolymer containing 16% butadiene/styrene (90/10 wt. %) rubber and having the ratio of S/AN of 77/23, having a particle size, weight average, of 0.64 microns.

ABS-I (b): a graft copolymer containing 16% butadiene/styrene (90/10 wt. %) rubber and having the ratio of S/AN of 77/23, having a particle size, weight average, of 0.35 microns.

ABS-s: a graft copolymer containing 53% butadiene rubber, and having SAN ratio of 73/27 and a weight average particle size of 0.28 microns.

SAN: a copolymeric phase having a ratio of styrene/acrylonitrile of 72.5/27.5.

The Vicat temperature was determined in accordance with ASTM 1525; Izod impact strength, in accordance with ASTM D 256; Multiaxial impact strength, in accordance with ASTM D3763 (test velocity 6.7 m/s; striker mass selected to minimize velocity loss during impact.) Ductility: the definition of ductile failure for the examples presented in the table below, is based on General Motors Engineering standard GMP.ABS+PC.002. Using the multiaxial impact test, a test specimen is deemed to have exhibited ductile failure if the puncture of the test specimen is accompanied by cracks radiating no more than 10 mm beyond the center of the impact point. The reported ductile failures denote the percents of the specimens failed in this fashion, out of the fifteen specimens tested.

The compositions also contained a mold release agent and an antioxidant in conventional amounts, having no criticality in the context of the invention. The compositions of the invention (represented by Examples 1, 2, 3 and 4) are set in comparison to a corresponding composition, Example 5, which although containing a corresponding amount of rubber and exhibits largely identical or better Vicat properties and Izod impact strength, is characteristically more brittle at low temperature than are the inventive compositions.

TABLE 1

|  | 1 | 2 | 3 | 4 | 5(Com.) |
|---|---|---|---|---|---|
| Polycarbonate | 70 | 70 | 70 | 70 | 70 |
| ABS-I(a) | 30 | 27 |  |  |  |
| ABS-I(b) |  |  | 30 | 27 |  |
| ABS-s |  | 3 |  | 3 | 13 |
| SAN |  |  |  |  | 17 |
| Total Rubber | 4.8 | 5.91 | 4.8 | 5.91 | 6.89 |
| Properties |  |  |  |  |  |
| Vicat temperature (° C.) 1 Kg @ 120° C./hr | 144 | 144.9 | 144.2 | 144.3 | 145 |
| Impact Strength, Izod (ft-lb/in) |  |  |  |  |  |
| ⅛" At 23° C. | 11.7 | 10.9 | 10.9 | 11 | 11.5 |
| ⅛" At −30° C. | 5.3 | 7.1 | 5.7 | 7.8 | 9 |
| multiaxial Impact strength, at −30° C. (J) |  |  |  |  |  |
| (Emax) | 50 | 56 | 52 | 51 | 46 |
| (Efail) | 55 | 60 | 56 | 56 | 48 |
| Brittle/Ductile | 9/6 | 1/14 | 10/5 | 2/13 | 10/0 |
| Ductile failures, percent | 40 | 93 | 33 | 87 | 0 |

A series of compositions demonstrating the advantages of the inventive composition over corresponding compositions that contain a flaky filler of the type presently excluded has been prepared and the properties determined as shown in table 2 below. The preparation of the compositions and their evaluations followed essentially the procedures and method and made use of components similar to the ones described above. The composition representative of the invention (Example A) is set in comparison to corresponding compositions, Examples B and C which in addition contain 10 parts by weight of talc.

TABLE 2

|  | A | B | C |
|---|---|---|---|
| Polycarbonate | 70 | 70 | 70 |
| ABS-I (a) | 27 | 27 | 27 |
| ABS-s | 3 | 3 | 3 |
| Talc | 0 | 10 | 10 |
| Properties |  |  |  |
| Vicat temperature (° C.) 1 Kg @ 120° C./hr | 141.7 | 133.6 | 141.8 |
| Impact Strength, Izod (ft − ib/in) |  |  |  |
| ⅛" At 23° C. | 11.9 | 1.2 | 9.5 |
| ⅛" At −30° C. | 9.2 | 0.9 | 3.9 |
| Multiaxial Impact strength, at −30° C. (J) |  |  |  |
| (Emax) | 44.4 | 14.9 | 37.4 |
| (Efail) | 46.6 | 15.4 | 40.0 |
| Brittle/Ductile | 1/9 | 10/0 | 10/0 |
| Ductile failures, percent | 90 | 0 | 0 |

The particle size of the talc that was used in Example B was 1.7–3 microns and its mean aspect ratio was 1.76 (range 1–9.13)

The particle size of the talc that was used in Example C was 2–4 microns and its mean aspect ratio was 1.94 (range 1.01–5.78)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting of a blend of:
   (i) 60 to 80 percent polycarbonate resin; and
   (ii) 20 to 40 percent of a mixture of at least two grafted rubbers, said percents being in relation to the weight of the blend, wherein mixture (ii) contains,
      (a) a small-mode component containing a grafted rubber having a particle size, weight average, smaller than 0.3 microns, and
      (b) a large-mode component containing a grafted rubber having a particle size, weight average of 0.35 to 0.65 microns, further wherein said small-mode component (a) and said large-mode component (b) are present in the blend at a weight ratio of 3/27 to 7.5/22.5 therebetween, and said composition is free of flaky filler having an aspect ratio of at least 1.7 and particle size of 1–100 microns.

2. The thermoplastic molding composition of claim 1 wherein said blend contains 65 to 75 percent polycarbonate and 25 to 35 percent of said mixture.

3. The thermoplastic molding composition of claim 1 wherein the weight ratio of said small-mode component (a) and said large-mode component (b) of mixture (ii) is 3/27 to 5/25.

4. The thermoplastic molding composition of claim 1 wherein said small-mode component (a) is a product of emulsion polymerization.

5. The thermoplastic molding composition of claim 1 wherein said large-mode component (b) is a product of mass polymerization.

6. The thermoplastic molding composition of claim 1 wherein said large-mode component (b) is a product of continuous mass polymerization.

7. The thermoplastic molding composition of claim 1 wherein said small-mode component (a) has a particle size, weight average, of 0.15 to 0.28 microns.

8. The thermoplastic molding composition of claim 1 wherein said large-mode component (b) contains rubber at an amount of 14 to 20% relative to its weight.

9. The thermoplastic molding composition of claim 1 wherein said small-mode component (a) contains rubber at an amount of 50 to 60% relative to its weight.

10. The thermoplastic molding composition of claim 9 wherein said small-mode component (a) contains a grafted phase, polymerized monovinylidene aromatic hydrocarbons and polymerized unsaturated nitrites in a weight ratio of 70-80/30-20 therebetween.

11. The thermoplastic molding composition of claim 9 wherein said small-mode component (a) contains a grafted phase, polymerized monovinylidene aromatic hydrocarbons and polymerized unsaturated nitrites in a weight ratio of 75-78/25-22 therebetween.

12. The thermoplastic molding composition of claim 8 wherein said large-mode component (b) contains a grafted phase, polymerized monovinylidene aromatic hydrocarbons and polymerized unsaturated nitrites in a weight ratio of 70-80/30-20 therebetween.

13. The thermoplastic molding composition of claim 8 wherein said large-mode component (b) contains a grafted phase, polymerized monovinylidene aromatic hydrocarbons and polymerized unsaturated nitrites in a weight ratio of 75-78/25-22 therebetween.

* * * * *